(12) United States Patent
Stegmeier et al.

(10) Patent No.: US 9,908,504 B2
(45) Date of Patent: Mar. 6, 2018

(54) BELT RETRACTOR FOR A VEHICLE SEAT BELT

(71) Applicant: TRW Automotive GmbH, Alfdorf (DE)

(72) Inventors: Michael Stegmeier, Schwaebisch Gmuend (DE); Frederic Michel, Schwaebisch Gmuend (DE)

(73) Assignee: TRW Automotive GmbH (DE)

( * ) Notice: Subject to any disclaimer, the term of this patent is extended or adjusted under 35 U.S.C. 154(b) by 62 days.

(21) Appl. No.: 14/495,987

(22) Filed: Sep. 25, 2014

(65) Prior Publication Data

US 2015/0083842 A1 Mar. 26, 2015

(51) Int. Cl.
| | |
|---|---|
| *B60R 22/38* | (2006.01) |
| *B60R 22/34* | (2006.01) |
| *B60R 22/10* | (2006.01) |
| *B60R 22/28* | (2006.01) |

(52) U.S. Cl.
CPC .............. *B60R 22/38* (2013.01); *B60R 22/10* (2013.01); *B60R 22/3413* (2013.01); *B60R 2022/288* (2013.01); *B60R 2022/385* (2013.01)

(58) Field of Classification Search
CPC .......... B60N 2/2806; B60N 2002/2815; B60R 22/10; B60R 22/3413; B60R 2022/286; B60R 2022/288; B60R 22/38; B60R 2022/385
See application file for complete search history.

(56) References Cited

U.S. PATENT DOCUMENTS

| | | | | |
|---|---|---|---|---|
| 5,887,814 | A * | 3/1999 | Matsuki | B60R 22/3413 242/379.1 |
| 5,904,371 | A * | 5/1999 | Koning | B60R 22/3413 242/379.1 |
| 5,934,596 | A * | 8/1999 | Gorman | B60R 22/3413 242/379.1 |
| 6,206,315 | B1 * | 3/2001 | Wier | B60R 22/3413 242/379.1 |
| 6,863,235 | B2 * | 3/2005 | Koning | B60R 21/04 242/379.1 |

(Continued)

FOREIGN PATENT DOCUMENTS

| | | |
|---|---|---|
| DE | 10 2006 023 258 | 10/2007 |
| DE | 10 2007 026 128 | 5/2008 |

*Primary Examiner* — Sang K Kim
(74) *Attorney, Agent, or Firm* — Tarolli, Sundheim, Covell & Tummino LLP

(57) ABSTRACT

A belt retractor for a vehicle seat belt comprises a rotatably supported belt reel from which webbing can be unwound, a force limiting means which in a force limiting phase permits controlled webbing extension in the webbing extension direction when the belt reel is blocked and a particular force threshold is exceeded, and a change-over device for performing a change-over operation during which it is changed between a low force limitation level and a high force limitation level. In accordance with the invention, the change-over device includes a control means which in response to the identification of an installed child safety seat suppresses a change-over operation from the low force limitation level to the high force limitation level and/or triggers a change-over operation from the high force limitation level to the low force limitation level.

18 Claims, 5 Drawing Sheets

(56) References Cited

U.S. PATENT DOCUMENTS

| | | | | |
|---|---|---|---|---|
| 7,883,045 | B2* | 2/2011 | Yamada | .................. B60R 22/38 |
| | | | | 242/382.2 |
| 8,123,154 | B2* | 2/2012 | Singer | ................ B60R 22/3413 |
| | | | | 242/379.1 |
| 9,371,054 | B2* | 6/2016 | Ukita | .................... B60R 22/341 |
| 2005/0224623 | A1* | 10/2005 | Sumiyashiki | ........... B60R 22/41 |
| | | | | 242/384.2 |
| 2005/0284978 | A1* | 12/2005 | Zolkower | ............ B60R 22/3413 |
| | | | | 242/382.4 |
| 2006/0006725 | A1* | 1/2006 | Gentner | .............. B60R 22/4676 |
| | | | | 297/479 |
| 2008/0116310 | A1 | 5/2008 | Bedak et al. | |
| 2014/0375109 | A1* | 12/2014 | Jayasuriya | ............... B60R 22/12 |
| | | | | 297/475 |
| 2015/0107924 | A1* | 4/2015 | Stegmeier | ........... B60R 22/3413 |
| | | | | 180/268 |
| 2015/0360642 | A1* | 12/2015 | Lee | ....................... B60R 22/405 |
| | | | | 242/383.2 |

* cited by examiner

BELT RETRACTOR FOR A VEHICLE SEAT BELT

BACKGROUND OF THE INVENTION

The invention relates to a belt retractor for a vehicle seat belt.

For fastening a child safety seat in an automotive vehicle, apart from the conventional mounting by means of a seat belt, fastening systems have been established in which a rigid connection is made between the body of the vehicle and the child safety seat. These systems are known especially under the designation Isofix which originates from the standardization according to the ISO 13216 standard. Various means are known for detecting the installation of a child safety seat which is mounted in the vehicle by means of an Isofix or similar system.

SUMMARY OF THE INVENTION

The present invention is based on the finding that an identification of a child safety seat is reasonable in connection with belt retractors permitting an adjustable belt force limitation in the case of restraint when the belt reel is blocked. Such generic belt retractor comprising an adaptive force limiter is shown, for example, in DE 10 2007 026 128 A1. This known force limiter is based on the consideration that the unwound webbing length is representative of the height and the weight, resp., of a vehicle occupant. In the case of crash, in response to the unwound webbing length the force limiter therefore is driven into a force limiting position at different points in time by a switching operation. In this way force limitation which is optimally adapted to the vehicle occupant is possible.

It is the object of the invention to ensure, in the case of a force limitation phase, reliable setting of a desired force limitation level for a belt retractor in response to the installation of a child safety seat. In particular, when the child safety seat is installed, it is to be ensured that no excessive force limitation level is adjusted.

This object is achieved by a belt retractor comprising the features of claim 1. Advantageous and expedient configurations of the belt retractors according to the invention are described in the pertaining subclaims.

The belt retractor for a vehicle seat belt according to the invention comprises a rotatably supported belt reel from which belt webbing can be unwound, a force limiting means permitting controlled unwinding of webbing in the webbing extension direction in a force limiting phase when the belt reel is blocked and a particular force threshold is exceeded, and a change-over device for performing a change-over operation for changing between a low force limitation level and a high force limitation level. In accordance with the invention, the change-over device includes a control means which, in response to the identification of an installed child safety seat, suppresses a change-over operation from the low force limitation level to the high force limitation level and/or triggers a change-over operation from the high force limitation level to the low force limitation level.

The invention now enables the presence of a child safety seat to be thoroughly taken into account when selecting the force limitation level in the force limiting phase in the case of belt retractors comprising an adaptive force limiter. This is important, as it has been found that when particular child safety seats are used an inappropriate selection of the force limitation level may occur without the child safety seat identification according to the invention. Especially large child safety seats require a relatively large webbing extension for fastening the seat belt for a child seated on the child safety seat. The webbing extension in these cases may be within a range corresponding to the webbing extension of a tall or heavy adult who is represented by a so called 95% dummy of the hybrid III type in the development of vehicle occupant protective devices. In the case of the belt retractor known from DE 10 2007 026 128 A1 such large webbing extension would always result in the fact that the change-over device sets a high force limitation level for a tall and/or heavy adult, although such high force limitation level is not required at all for a child.

In the case of the belt retractor according to the invention, on the other hand, a difference can be made between an adult and a child seated on a child safety seat so that an appropriate adjustment of the force limitation level can be ensured. Especially the control means guarantees that upon identification of an installed child safety seat force limitation in any case takes place on the low force limitation level. Where necessary, the control means "overrules" a change-over operation based on the unwound webbing length.

The preferred structure of the belt retractor according to the invention provides that the change-over device includes the following: a control lever adapted to be pivoted between a first position in which it adjusts the low force limitation level and a second position in which it adjusts the high force limitation level, and a switching means including a switch adapted to be pivoted between an inactive position and an active position in which it transfers the control lever into the second position upon rotation of the belt reel. The control means includes a blocking lever adapted to be pivoted between an inactivated position and an activated position in which it maintains the switch in the inactive position. The control functionalities according to the invention of the change-over device in the belt retractor can be realized very well in practice by means of pivoting members, as such members have proven for other belt retractor functionalities and are reliably manageable.

Expediently the switching means should be coupled to a device defining the unwound webbing length, wherein the switching means should be arranged so that it transfers the switch into the active position when a predetermined unwound webbing length is exceeded. In this way the basic functionality of the force limiter that a high force limitation level is adjusted for tall and/or heavy vehicle occupants is ensured.

In accordance with the preferred embodiment of the invention, the control means is coupled to a child safety seat identification means and is arranged so that the blocking lever is activated when a child safety seat is installed. Activating the blocking lever prevents the switch from adopting the active position. This guarantees that even when the predetermined unwound webbing length is exceeded no change-over to the high force limitation level takes place, when it has been identified that a child safety seat is installed.

Concretely speaking, changing from the low to the high level—on the precondition that no child safety seat has been identified—can be realized by engagement of the control lever in the switch (only) in the second position upon rotation of the belt reel, when the switch is in the active position. The rotation of the belt reel is advantageously used as "switching energy", i.e. the kinematic energy required for pivoting the control lever is provided by the rotating belt reel.

Optimum interaction of the control lever and the switch for reliably reproducible pivoting of the control lever is provided by a design in which the control lever includes an extension and the switch includes a ramp structure adapted to the extension.

When upon installing a child safety seat first a webbing amount exceeding the predetermined length is unwound, before then the child safety seat is mounted—in a manner that can be registered by a child seat identification means—, the switching means first ensures change-over to the high force limitation level by transferring the switch into the active position. In this case the control means must overrule the switching means due to the later identified child safety seat to the effect that it is switched back to the low force limitation level again. For this purpose, it is first of all required to remove the switch from the active position. This can be advantageously done by the blocking lever in that upon pivoting to the activated position it forces the switch into the inactive position, when the switch was in the active position before.

Even if in this case the switch is forced to the inactive position and is maintained in said position by the blocking lever, it must be ensured that the control lever in fact adopts the first position. This can advantageously be achieved in that in the second position upon rotation of the belt reel the control lever engages in the blocking lever when the latter is in the activated position. The rotation of the belt reel again serves as pivoting operation for the control lever.

Optimum interaction of the control lever and the blocking lever for reliable once-only pivoting of the control lever under these circumstances is provided by a design in which the control lever includes an extension and the blocking lever includes a ramp structure adapted to the extension.

BRIEF DESCRIPTION OF THE DRAWINGS

Further features and advantages of the invention will be resulting from the following description and from the enclosed drawings which are referred to, and in which.

DESCRIPTION OF EMBODIMENT

Figure 1:
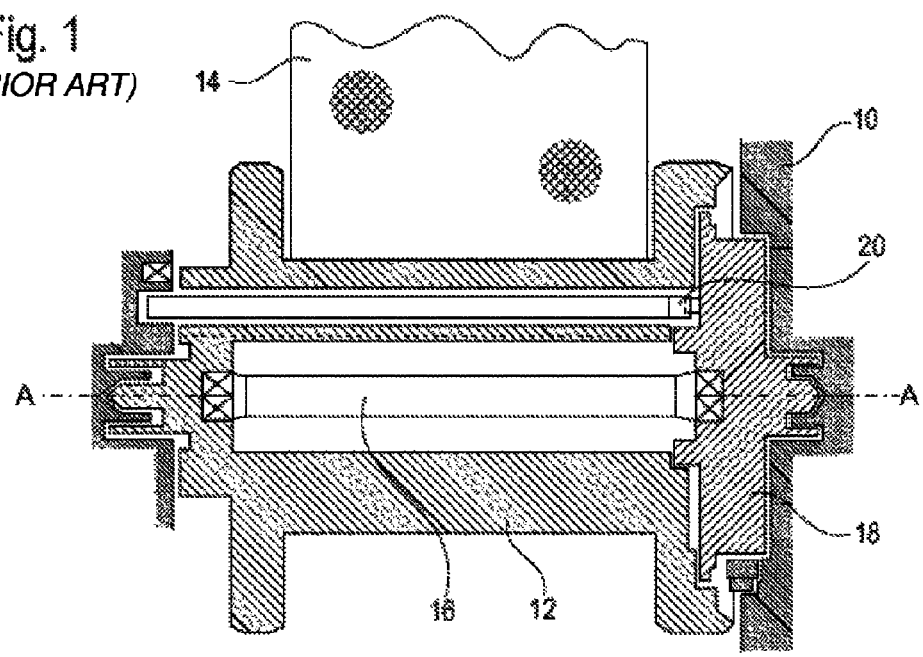
FIG. 1 shows a sectional view of a known belt retractor.

By way of example, the following description of a preferred embodiment of the invention is based on a belt retractor comprising an adaptive force limiter as it is illustrated in FIG. 1 and described in DE 10 2007 026 128 A1. In this respect, concerning the basic structure reference is made to said document.

A belt reel 12 rotatably supported in a frame 10 about an axis A (frequently also referred to as belt retractor axis) from which webbing 14 can be unwound is coupled in a rotationally fixedly manner to a disk 18 by means of a torsion rod 16. When, in a case of crash, with a blocked belt reel 12 the webbing extension force transferred to the belt reel 12 via the webbing 14 by the forward movement of the vehicle occupant exceeds the torsion resistance moment of the torsion rod 16, the torsion rod 16 is twisted and the belt reel 12 rotates relative to the disk 18.

What is essential to the function of the force limiter is the fact that with force limitation it can be changed over from a low first force limitation level defined here by the twisting of the torsion rod 16 to a higher second force limitation level by means of a change-over device.

For this purpose, an additional force limiting element in the form of a cutting member 20 is provided which can be activated by an activating mechanism into a force limiting position in which it cuts material of the belt reel 12 upon rotation of the belt reel 12 relative to the disk 18. The activating mechanism controls the cutting member 20 in response to the unwound webbing length to adopt the force limiting position. This is to say that depending on the height and/or weight of a vehicle occupant the cutting member 20 is activated or not, where necessary it can even be repeatedly changed between the force limitation levels. Different embodiments of the activating mechanism are known from DE 10 2007 026 128 A1.

In the belt retractor according to the invention, apart from the unwound webbing length the identification of an installed child safety seat constitutes a further criterion for the force limitation level which is adjusted. For this, a means 77 (see FIG. 3) for identifying an installed child safety seat coupled to the change-over device is provided. When a child safety seat is installed, it shall be ensured in any case that the lower force limitation level out of e.g. two basically available force limitation levels is adjusted. The components of the belt retractor provided for this purpose shall be described hereinafter by way of FIGS. 2 to 8.

Figure 2:
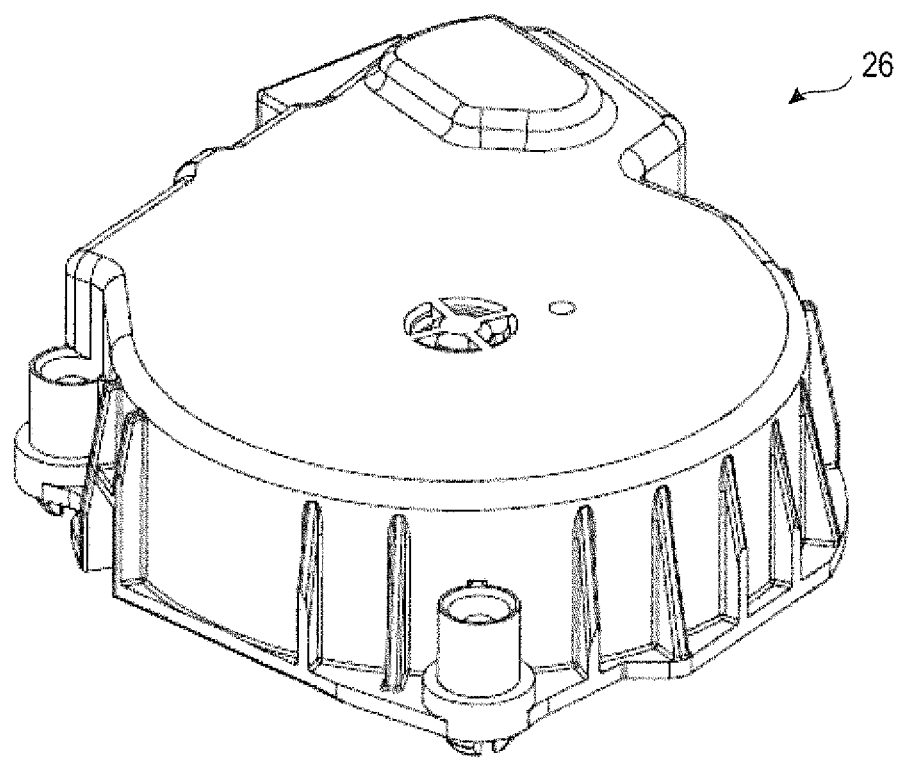
FIG. 2 shows an exploded view of parts of a belt retractor according to the invention.
Figure 2:
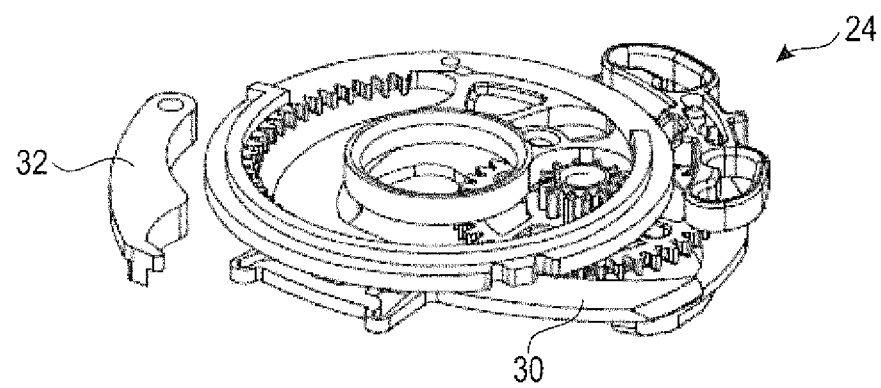
Figure 2:
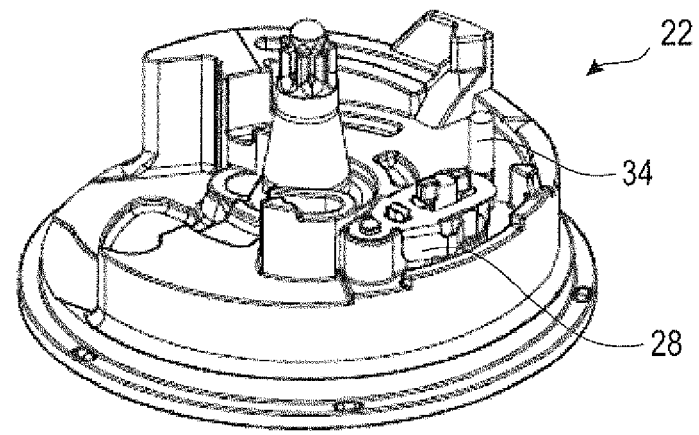
Figure 4:
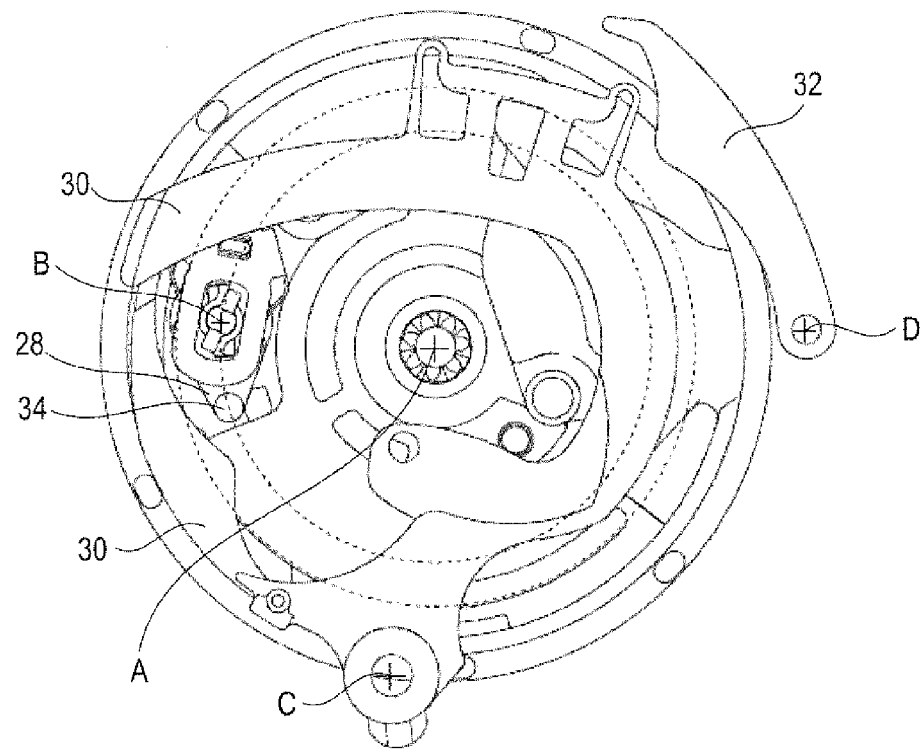
FIG. 4 shows a top view of the control mechanism and the belt reel attachment of FIG. 2, when the blocking lever is inactivated and the switch is active.
Figure 5:
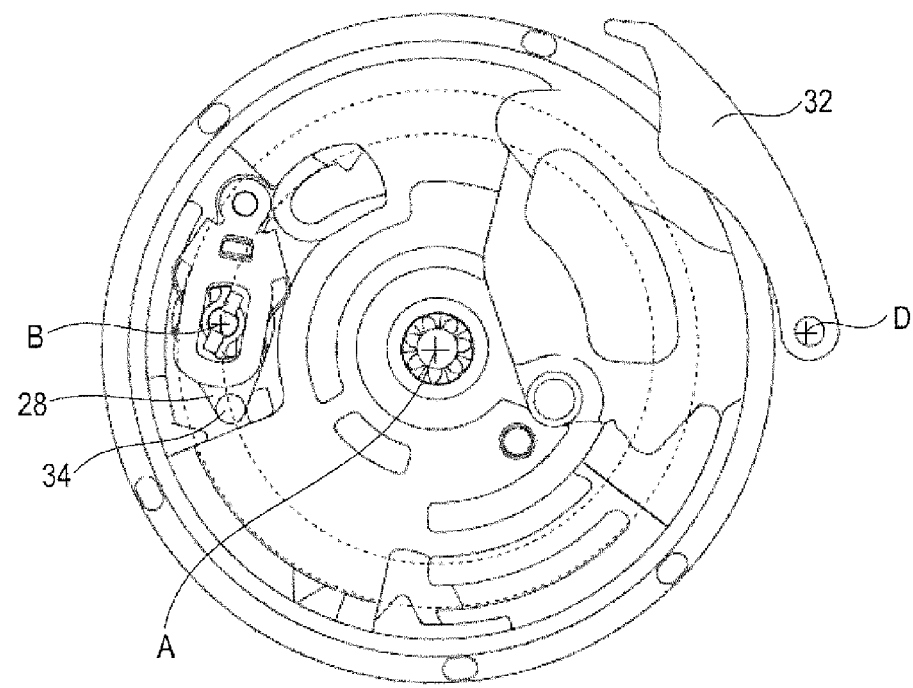
FIG. 5 shows the view of FIG. 4 without the switch.

FIG. 2 illustrates a belt reel attachment 22 fixedly connected to an end face of the belt reel, a control mechanism 24 and a retractor shell 24 serving for support and as a cover. Substantial components for adjusting and changing over the force limitation level are a control lever 28, a switch 30 and a blocking lever 32.

The control lever 28 is arranged eccentrically with respect to the axis of rotation A of the belt reel and is supported so that it can be pivoted about a parallel pivot axis B offset relative to the axis of rotation A of the belt reel. More exactly speaking, a free end of the control lever 28 including an extension 34 extending in parallel to the axis of rotation A and the pivot axis B can be pivoted to a restricted extent between a first position and a second position.

Figure 6:
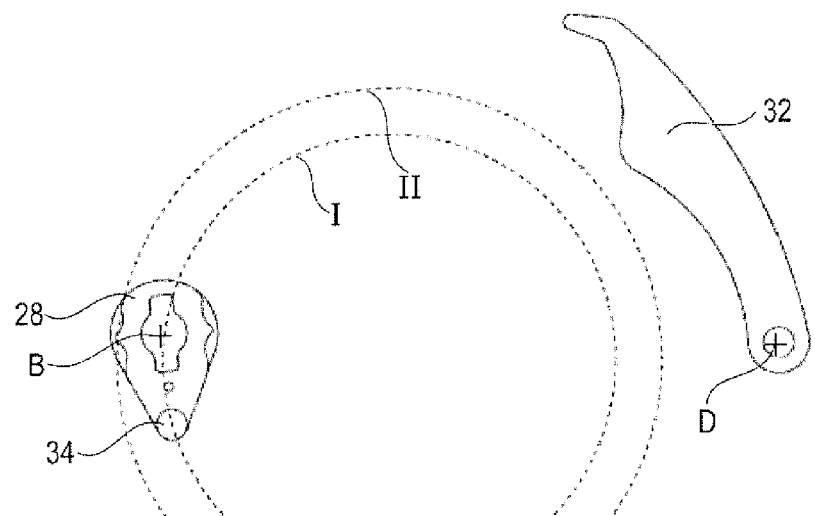
FIG. 6 shows the control lever and the blocking lever in the view according to FIG. 4.

FIG. 6 showing the trajectories I and II along which the extension 34 moves in the first position and in the second position, resp., upon rotation of the belt reel is intended to serve for the purpose of illustrating the two possible positions of the control lever 28. Without describing the force limiting means and the activating mechanism thereof in detail, it is important here that the inner trajectory I corresponds to a low force limitation level and the outer trajectory II corresponds to a high force limitation level. Hence, when the control lever 28 is in the first position, the extension 34 follows the inner trajectory I and the force is limited on the low level. When, however, the control lever 28 is in the second position, the extension 34 follows the outer trajectory II, and accordingly the force limitation is performed on the high level.

Figure 7:
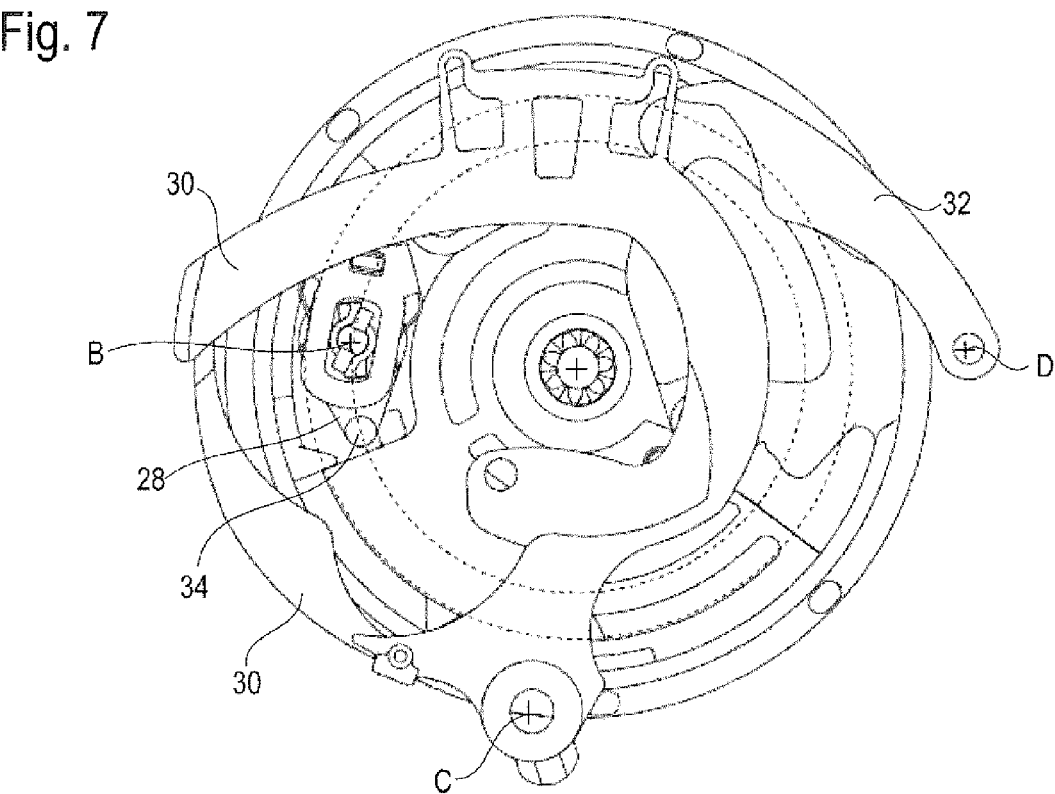
FIG. 7 shows a top view of the control mechanism and the belt reel attachment of FIG. 2, when the blocking lever is activated and the switch is inactive.
Figure 8:
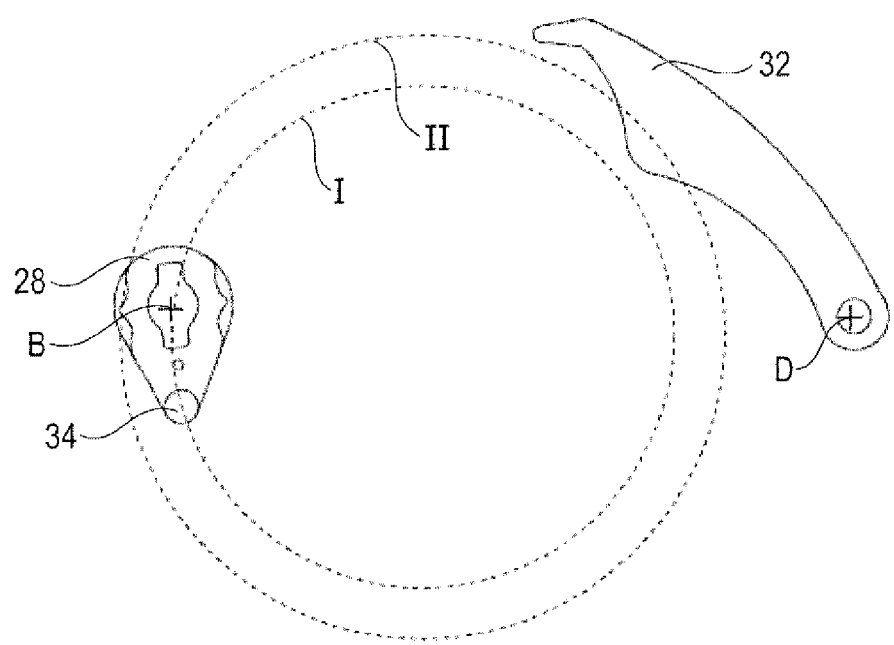
FIG. 8 shows the control lever and the blocking lever in the view according to FIG. 7.

The switch 30 ensures the deflection of the control lever 28 required for change-over to the high force limitation level. The switch 30 is equally pivoting in a plane perpendicular to the axis of rotation A of the belt reel, wherein its pivot axis C in turn is displaced in parallel to the axis of rotation A of the belt reel. The switch 30 can be pivoted between an active position shown in FIGS. 3 and 4 and an inactive position which is shown in FIG. 7. Stops may be provided for limiting the pivoting range. A spring element (not shown here) biases the switch in the direction of the active position.

The switch 30 is part of a switching means which decides on the deflection of the switch 30 in response to the unwound webbing length. For this purpose, the switching means is coupled to a means including a counting mechanism for the belt reel revolutions or the like to determine the unwound webbing length. The switching means especially ensures that the switch 30 is transferred into the active position when a predetermined unwound webbing length is exceeded.

Figure 3:
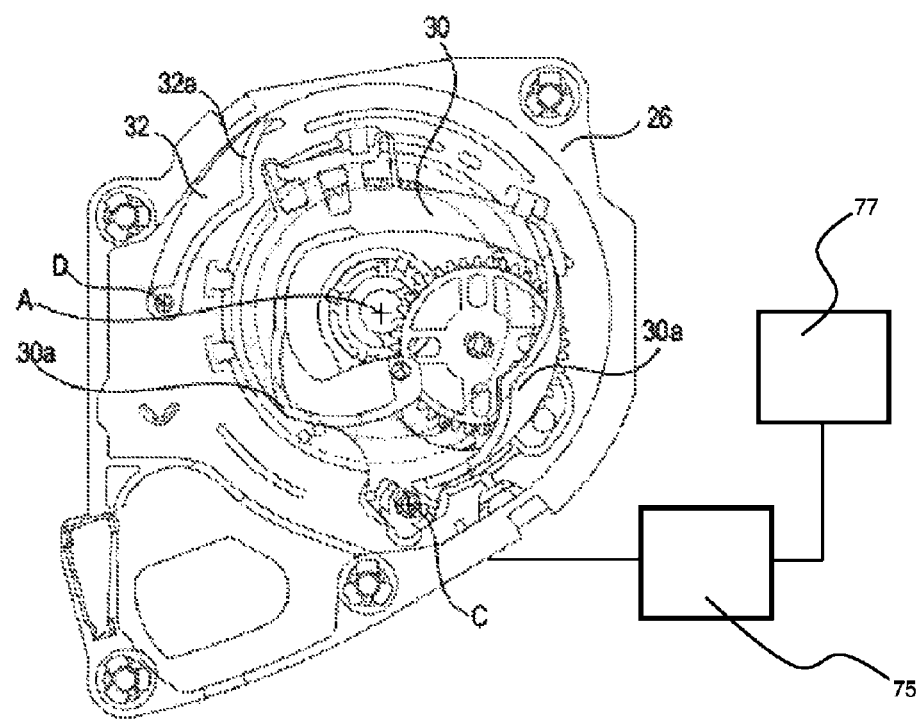
FIG. 3 shows a view from the bottom of the control mechanism and the retractor shell of FIG. 2, when the blocking lever is inactivated and the switch is active.

The switch 30 includes segments having a ramp structure 30a extending in the axial direction which is evident at the best in FIG. 3 (in the view of FIG. 3 the ramp elements extend toward the viewer). The switch 30 thus makes available a pivoting crank for the extension 34 of the control lever 28, as will be explained in detail further below.

The blocking lever 32 is adapted to be pivoted, similarly to the switch 30, in a plane perpendicular to the axis of rotation A of the belt reel about a parallel pivot axis D offset with respect to the axis A. The blocking lever 32 can be pivoted between an inactivated position shown in FIGS. 3 to 6 and an activated position shown in FIGS. 7 and 8. A spring element (not shown here) biases the blocking lever 32 in the direction of the activated position.

The blocking lever 32 is part of a control means 75 (see FIG. 3) which decides on the deflection of the blocking lever 32 in response to the installation of a child safety seat. For this purpose, the control means 75 is coupled to the child safety seat identification means 77 which identifies mechanically and/or electrically, e.g. by means of appropriate switches or sensors, whether or not a child safety seat is installed. Especially the control means 75 ensures that the blocking lever 32 is activated when the child safety seat is installed.

The blocking lever 32 equally includes a ramp structure 32a extending in the axial direction which in turn is at the best evident in FIG. 3 (the ramp extends toward the viewer in the view of FIG. 3). The blocking lever 32 thus makes available another pivoting crank for the extension 34 of the control lever 28, as will be explained in more detail in the following description of the functioning of the change-over device of the belt retractor.

When the child safety seat identification means identifies no installed child safety seat, the blocking lever 32 is permanently maintained in the inactivated position (see FIGS. 3 to 6). When during a fastening operation the webbing extension exceeds the predetermined webbing length, which allows to conclude a tall and/or heavy vehicle occupant, the switching means ensures that the switch 30 adopts the active position (see FIGS. 3 and 4). In the active position of the switch 30 the extension 34 of the control lever 28, which upon rotation of the belt reel until then in the first position has moved on the inner trajectory I, engages in the ramp structure 30a of the switch 30 during further rotation of the belt reel. The ramp structure 30a is designed so that the control lever 28 is pivoted so that the extension 34 arrives at the outer trajectory II. The ramp structure 30a thus constitutes a crank guide for the extension 34 which causes pivoting of the control lever 28 from the first position into the second position with the aid of the rotation of the belt reel. This operation takes place only once so that the control lever 28 subsequently remains in the second position. Thus the high force limitation level is adjusted.

When the child safety seat identification means 77 identifies an installed child safety seat, however, the blocking lever 32 is activated (see FIGS. 7 and 8) and is maintained in the activated position. Thus the blocking lever 32 engages in the switch 30 which is provided in the inactive position as is shown in FIG. 7. In the activated position the blocking lever 32 thus maintains the switch 30 "active" in the inactive position. When the webbing extension now exceeds the predetermined webbing length, the switching means cannot transfer the switch 30 into the active position, because the latter is blocked by the blocking lever 32. Hence the control means 75 in this case overrules the switching means. Since the control lever 28 in this constellation does not engage in the ramp structure 30a of the switch 30, the control lever 28 is not pivoted and the extension 34 is retained on the inner trajectory I. In this way, change-over to the high force limitation level is suppressed.

In the event that a child safety seat is installed only after a large amount of webbing has been unwound already, the control means 75 nevertheless adjusts the low force limitation level. Since during webbing extension initially no child safety seat is identified, the blocking lever 32 first remains in the inactivated position and the switch 30 is transferred into the active position when the predetermined webbing extension length is exceeded so that the control lever 28 is pivoted into the second position, as described before. This would mean a high force limitation level. As soon as the child safety seat identification means 77 signals, however, that a child safety seat has been installed, the control means 75 activates the blocking lever 32. When the blocking lever 32 is transferred into the activated position, it entrains the switch 30 and transfers the latter into the inactive position. The control lever 28 then is still provided in the second position, however. When the belt reel is further rotated, the extension 34 of the control lever 28 is engaged in the ramp structure 32a of the blocking lever 32, however. The ramp structure 32a is designed so that the extension 34 is directed from the second trajectory II back to the first trajectory I. The ramp structure 32a thus constitutes a crank guide for the extension 34 which causes the control lever 28 to pivot from the second position into the first position with the aid of the belt reel rotation. This operation takes place only once so that the control lever 28 consequently remains in the first position. Thus the low force limitation level desired in this case is adjusted.

The described belt retractor comprising the particular force limitation change-over device is suited both for the passenger seat and for the back seats of an automotive vehicle.

The invention claimed is:

1. A belt retractor for a vehicle seat belt comprising:
   a rotatably supported belt reel from which webbing can be unwound,
   a force limiting means which in a force limiting phase permits controlled webbing extension in the webbing extension direction when the belt reel is blocked and a particular force threshold is exceeded, and
   a change-over device for performing a change-over operation during which it is changed between a low force limitation level and a high force limitation level,
   wherein the change-over device includes:
   a control means which in response to the identification of an installed child safety seat suppresses a change-over operation from the low force limitation level to the high force limitation level or which in response to the identification of an installed child safety seat triggers a change-over operation from the high force limitation level to the low force limitation level;
a control lever (28) adapted to be pivoted between a first position in which it adjusts the low force limitation level and a second position in which it adjusts the high force limitation level; and
a switching means comprising a switch (30) adapted to be pivoted between an inactive position and an active position in which upon rotation of the belt reel it transfers the control lever (28) into the second position;
and in that the control means includes a blocking lever (32) adapted to be pivoted between an inactivated position and an activated position in which it maintains the switch (30) in the inactive position.

2. The belt retractor according to claim 1, wherein the switching means is coupled to a means defining the unwound webbing length, wherein the switching means is arranged so that it transfers the switch (30) into the active position when a predetermined unwound webbing length is exceeded.

3. The belt retractor according to claim 1, wherein the control means is coupled to a child safety seat identification means and is arranged so that the blocking lever (32) is activated when a child safety seat is installed.

4. The belt retractor according to claim 1, wherein, in the first position upon rotation of the belt reel the control lever (28) engages in the switch (30) when the latter is in the active position.

5. The belt retractor according to claim 4, wherein the control lever (28) includes an extension (34) and the switch (30) includes a ramp structure (30a) adapted to the extension (34).

6. The belt retractor according to claim 1, wherein when the blocking lever (32) pivots into the activated position it forces the switch (30) into the inactive position when the switch (30) was in the active position before.

7. The belt retractor according to claim 6, wherein in the second position upon rotation of the belt reel the control lever (28) engages in the blocking lever (32) when the latter is in the activated position.

8. The belt retractor according to claim 7, wherein the control lever (28) includes an extension (34) and the blocking lever (32) includes a ramp structure (32a) adapted to the extension (34).

9. The belt retractor according to claim 1, wherein the change-over device includes a control means which in response to the identification of an installed child safety seat suppresses a change-over operation from the low force limitation level to the high force limitation level.

10. The belt retractor according to claim 1, wherein the change-over device includes a control means which in response to the identification of an installed child safety seat triggers a change-over operation from the high force limitation level to the low force limitation level.

11. The belt retractor according to claim 1, wherein the change-over device includes a control means which in response to the identification of an installed child safety seat suppresses a change-over operation from the low force limitation level to the high force limitation level and triggers a change-over operation from the high force limitation level to the low force limitation level.

12. A belt retractor for a vehicle seat belt comprising:
a belt reel rotatably supported in a frame;
webbing that can be unwound from the belt reel;
a force limiter having a force limiting phase that permits controlled unwinding of the webbing when rotation of the belt reel is blocked and a force threshold is exceeded; and
a change-over device for performing a change-over operation and including a control, the change-over operation changing the force limiter between a low force limitation level and a high force limitation level, the control ensuring that the force limiter is in the low force limitation level in response to identification of an installed child safety seat, the change-over device comprising:
a control lever pivotable between first and second positions, the control lever selecting the low force limitation level in the first position and selecting the high force limitation level in the second position;
a switch pivotable between an inactive position and an active position, the switch moving the control lever into the second position upon rotation of the belt reel when the switch is in the active position; and
the control including a blocking lever pivotable between an inactivated position and an activated position, the blocking lever maintaining the switch in the inactive position when the blocking lever is in the activated position.

13. The belt retractor according to claim 12, wherein the switch is coupled to means defining an unwound webbing length, the switch pivoting into the active position when a predetermined unwound webbing length is exceeded.

14. The belt retractor according to claim 12, wherein the control is coupled to a child safety seat identifier and is arranged such that the blocking lever is activated when the child safety seat identifier indicates that a child safety seat is installed.

15. The belt retractor according to claim 12, wherein the switch is forced by the blocking lever from the active position into the inactive position when the blocking lever pivots into the activated position.

16. The belt retractor according to claim 12, wherein the control prevents the change over operation from the low force limitation level to the high force limitation level in response to identification of an installed child safety seat.

17. The belt retractor according to claim 12, wherein the control triggers the change-over operation from the high force limitation level to the low force limitation level in response to identification of an installed child safety seat.

18. The belt retractor according to claim 12, wherein the control prevents the change over operation from the low force limitation level to the high force limitation level in response to identification of an installed child safety seat and triggers the change-over operation from the high force limitation level to the low force limitation level in response to identification of an installed child safety seat.

* * * * *